United States Patent [19]

Grobecker

[11] Patent Number: 5,101,971

[45] Date of Patent: Apr. 7, 1992

[54] STORAGE CASSETTE FOR A DISC HAVING A CENTER HOLE

[75] Inventor: Hermann Grobecker, Garbsen, Fed. Rep. of Germany

[73] Assignee: Philips and Dupont Optical Company, Nieuwegein, Netherlands

[21] Appl. No.: 570,244

[22] Filed: Aug. 17, 1990

[30] Foreign Application Priority Data

Aug. 19, 1989 [DE] Fed. Rep. of Germany ....... 3927380

[51] Int. Cl.⁵ .............................................. B65D 85/57
[52] U.S. Cl. .................................... 206/232; 206/310
[58] Field of Search ................................ 206/307–313, 206/232, 444, 235, 823

[56] References Cited

U.S. PATENT DOCUMENTS

| | | | |
|---|---|---|---|
| 4,520,470 | 5/1985 | d'Alayer de Costemore d'Arc | 206/310 |
| 4,684,017 | 8/1987 | Watanabe et al. | 206/235 |
| 4,702,369 | 10/1987 | Philosophe | 206/312 |
| 4,722,439 | 2/1988 | Grobecker | 206/309 |
| 4,750,611 | 6/1988 | Morrone | 206/309 |
| 4,793,480 | 12/1988 | Gelardi et al. | 206/312 |
| 4,807,749 | 2/1989 | Ackeret | 206/309 |
| 4,881,640 | 11/1989 | Herr et al. | 206/313 |

Primary Examiner—Jimmy G. Foster
Attorney, Agent, or Firm—David R. Treacy

[57] ABSTRACT

A container (2) for a disc (4) having a center hole (6) comprises a bottom section (8) having a bottom (10), upright side walls (12), a rear wall (14) and a front wall (16), and a cover (18) which closes the bottom section at the top and which is held in a closed position by means of a cover lock, the upper side of the bottom section carrying an elastic peg arrangement (22) to retain the disc in its center. In its center the front wall of the bottom section has a front wall recess (24) and the cover lock is situated near the front wall recess.

17 Claims, 7 Drawing Sheets

STORAGE CASSETTE FOR A DISC HAVING A CENTER HOLE

BACKGROUND OF THE INVENTION

The invention relates to a storage cassette for a disc having a centre hole, which cassette comprises a bottom section having a bottom, upright side walls, a rear wall and a front wall, and a cover which closes the bottom section at the top and which can be held in a closed position by means of a cover lock, which bottom section comprises an elastic peg arrangement which is engageable in the centre hole to retain the disc at its upper side in the central area.

Containers of this type are employed on a large scale, for example for packaging the well-known CDs (Compact Discs) or CD-ROMs (Compact Disc Read Only Memory). In the CD containers in accordance with European Patent Specification 0,086,484, to which U.S. Pat. No. 4,874,085 corresponds, the CD is supported only in its central area directly around the centre hole, and the remainder of the CD remains completely free. In this way the container guarantees an excellent protection of the CD. Another significant advantage of the prior-art container is that except for printed paper sheets it comprises only standard parts, so that the container is in principle the same, regardless of the music on the disc. This leads to a substantial cost reduction resulting from the large economies obtained by unitary mass production.

Said prior-art container in principle comprises three different parts: a plastics bottom section, a plastics cover and a plastics support for the CD arranged in the bottom section. Between the bottom section and the support and in the cover leaflets can be inserted. The bottom section as well as the cover are made of a transparent plastics, so that the leaflets are visible through the transparent plastics. In this way the CD containers, which are made of standard parts, can be individualised by the use of different leaflets. Each container has a different appearance adapted to the music on the CD. The cover lock comprises cooperating parts on the side walls of the bottom section and on the corresponding side walls of the cover. The cover does not have a front wall. The peg arrangement is situated on the plastics support. The plastics support as well as the side walls of the bottom section have recesses to enable the CD to be removed from the container. The recesses enable the edge of the CD to be held between the the fingers.

Despite its undeniable qualities and advantages the container described above also has certain drawbacks. For example, it is not obvious to everyone how the cover is to be opened. It is often attempted to open the cover at the front. However, the front wall forms part of the bottom section. To open the cassette correctly it is necessary to hold the front wall of the container with one hand and to grip the cover with the other hand and pull it upwards by its two side walls. Once this method of opening is known, opening is very simple provided that both hands are free to open the container. However, this is not always the case. For example if CDs are used in cars it is generally desirable that under any circumstances the driver holds the wheel with at least one hand. Moreover, his attention should remain focussed on the traffic and the road, so that the container is to be opened by the feel.

It is found that opening the prior art container with only one hand as well as the subsequent removal of the CD from this container may pose a problem. The cover is connected to the bottom section at two points, namely at both sides. If the cover is opened at one of the two sides this need not imply that the other side also opens. The thin plastics cover is comparatively elastic and flexible so that one side can be opened to some extent while the other side remains closed. When the cover is open, removal of the CD from the container is not always simple if only one hand is free. The frictional forces with which the central peg arrangement holds the disc in its centre may be comparatively large. It is often difficult to pull the disc off the peg arrangement, and in addition care must be taken not to lose hold of the disc.

SUMMARY OF THE INVENTION

It is an object of the invention to provide a container of the type defined in the opening paragraph which can be opened easily with only one hand and which, depending on the embodiments to be described hereinafter, may also have many other advantages. According to the invention, a forwardly opening front wall recess is formed in the centre of the front wall (that is, midway between the side walls), and the cover lock is situated at the location of the front wall recess. The recess in the front wall of the container provides a clear indication to the user where and how the cover can be opened. Opening the cover is not impaired by elastic deformation of the cover because the cover lock is situated in the direct vicinity of the location where the cover is to be opened by a user.

In order to facilitate opening of the cover with only one hand an embodiment is of importance which is characterized in that in the closed position the space in the front-wall recess between the cover and the bottom section is large enough for partly inserting a finger. The significance of this embodiment primarily resides in the fact that the part of the finger which can be inserted in the space between the cover and the bottom section, for example the nail and the front of the thumb, allows the cover to be readily opened by leverage. In comparison with pulling up of the cover this has the advantage that the reactive force to open the cover is transmitted directly to the bottom section by the finger with which the cover is opened. It is the necessity of exerting a reactive force often which makes it difficult on impossible to open a container with one hand.

Once the cover has been opened with success the CD is to be removed from the container, i.e. from the central peg arrangement. An embodiment of the invention which is favourable in this respect is characterized in that the front wall recess is continued into the bottom. Since the front wall recess is continued into the bottom it is possible to insert a finger between the bottom and the underside of the CD to press the CD off the peg arrangement by a leverage. Thus, in fact the CD is removed from the peg arrangement using the same principle as for opening the cover, which has the advantages already mentioned.

The use of a further embodiment of the invention enables a container having a higher rigidity than the prior art container to be obtained. This embodiment is characterized in that the side walls and the rear wall are imperforate. This embodiment is particularly advantageous if a two-part container is used, which in contradistinction to the prior-art container described herein does not comprise a separate CD support arranged in the bottom section. It is obvious that the absence of the support affects the stiffness of the container. However, by the use of imperforate side walls and rear walls it is possible to guarantee an adequate stiffness.

To provide more possibilities of removing the disc from its container, a further embodiment may be characterized in that, in the proximity of the rear wall, the bottom section is formed with a finger-hold recess to allow finger access to the edge of the disc situated opposite the front wall recess. The presence of the finger hold recess does not interfere with the possibility of removing the disc from its container in the manner already described. This recess provides an additional possibility of removing the disc, which may be combined with the aforementioned method of removing the disc.

An important embodiment of the invention is characterized in that the cover is a plastics cover which is pivotally connected to the bottom section at the location of the rear wall and which comprises a front side having a transverse member which projects into the front-wall recess in the closed position. The transverse member enables the front wall recess to be closed at least partly in the closed position of the cover in order to provide a better protection of the disc in the container. A suitable embodiment of the invention may be characterized in that in order to form the cover lock the bottom of the bottom section is provided with bottom latching portions for the transverse-member of a plastics cover. Moreover, it may be characterized in that the cover comprises transverse member latching portions which are interengageable with the bottom latching portions.

It is also possible to insert a leaflet in the cover of the container in accordance with the invention. For this purpose an embodiment of the invention is of importance which is characterized in that at a specific distance from the inner side of the cover the transverse member comprises a nose for retaining a leaflet. This embodiment advantageously utilises the presence of the transverse member of the cover. Indeed, the leaflet requires a certain clearance in a direction transverse to the main surface of the cover.

Surprisingly, the invention also lends itself for entirely different embodiments, namely embodiments which are characterized in that the cover is a cardboard cover and forms a cover section of a cardboard part which, in addition to the cover section, comprises a lower section and a rear section, the lower section being arranged at the underside of the bottom of the storage cassette. Such an embodiment may be of importance in particular for cheaper discs, for example for small CDs, such as the standard 8 cm CDs. Such CDs contain less music and are therefore cheaper and specifically targeted at younger buyers. The design and production cost of this container should be adapted to this target group.

In order to achieve an adequate stiffness and resistance to wear an embodiment is important which is characterized in that the cardboard cover consists of two layers and is folded at the front. Since the cover is opened at the front of the container it is desirable that in particular at this location it has an adequate resistance to wear. The resistance to wear is guaranteed by the crease at the front. Another advantage of this embodiment is that the cardboard cover section need be printed on one side only. Nevertheless, this enables an attractive appearance to be obtained. The underside of the container, the rear side and the outer and the inner side of the cover may be provided with text and/or pictures.

In the case of a cardboard cover a suitable embodiment of the invention is characterized in that, to form the cover lock, the bottom section is provided with locking noses at opposite sides of the front recess and in that at the location of the front wall a cardboard cover can be held in its closed position underneath the locking noses and is disengageable from underneath the locking noses by a gentle pressure directly forwards the rear section. Satisfactory results have been obtained with an embodiment which is characterized in that the locking noses are so long that a cardboard cover bulges elastically to some extent as it is slid away. In this embodiment inventive use is made of the flexural strength of the cardboard cover to form the cover lock. This solves an essential problem associated with the use of cardboard covers for disc containers. Until now such container always failed to be successful because the cover could not be locked effectively. This is because a cardboard cover cannot be folded in such a way that the creases can be used both as a hinge and to hold the cover elastically in its closed position. As a result of the elasticity of the material, regardless of how the cover hinge has been folded, the cover always tends to move out of the closed position into a more or less open position under the influence of elastic forces. In the last-mentioned embodiment this partial opening is precluded by the locking noses. In fact the flexural resistance of the cover causes the the front side of this cover to engage underneath the noses, so that the cover remains closed. In order to open the cover a gentle pressure on the front side is adequate, causing the cover to bulge elastically to some extent and allowing the front of the cover to become disengaged from underneath the locking noses. The aforementioned problem of containers comprising cardboard covers is solved by combining a plastics bottom section with a cardboard cover and by the inventive use of elastic flexural forces in the cover in conjunction with locking noses in the bottom section.

It follows that the invention has a very large field of use because the container may be provided either with a plastics cover or with a cardboard cover. A manufacturer can even use a bottom section of a single standard type and can provide this section with a plastics cover or a cardboard cover, as desired. An embodiment of the invention which is of significance in this respect is characterized in that a universal bottom section having locking noses for a cardboard cover is used, and in that a plastics cover having recesses for the locking noses at its front side can be attached pivotably to the bottom section. This embodiment enables a disc container system to be obtained, which always employs the same bottom section, but whose appearance and price can be adapted by the use of either a plastics cover or a cardboard cover.

Embodiments of the invention will be described in more detail, by way of example, with reference to the accompanying drawings.

DESCRIPTION OF THE PREFERRED EMBODIMENTS

In the figures corresponding parts bear the same reference numerals.

Figure 1:
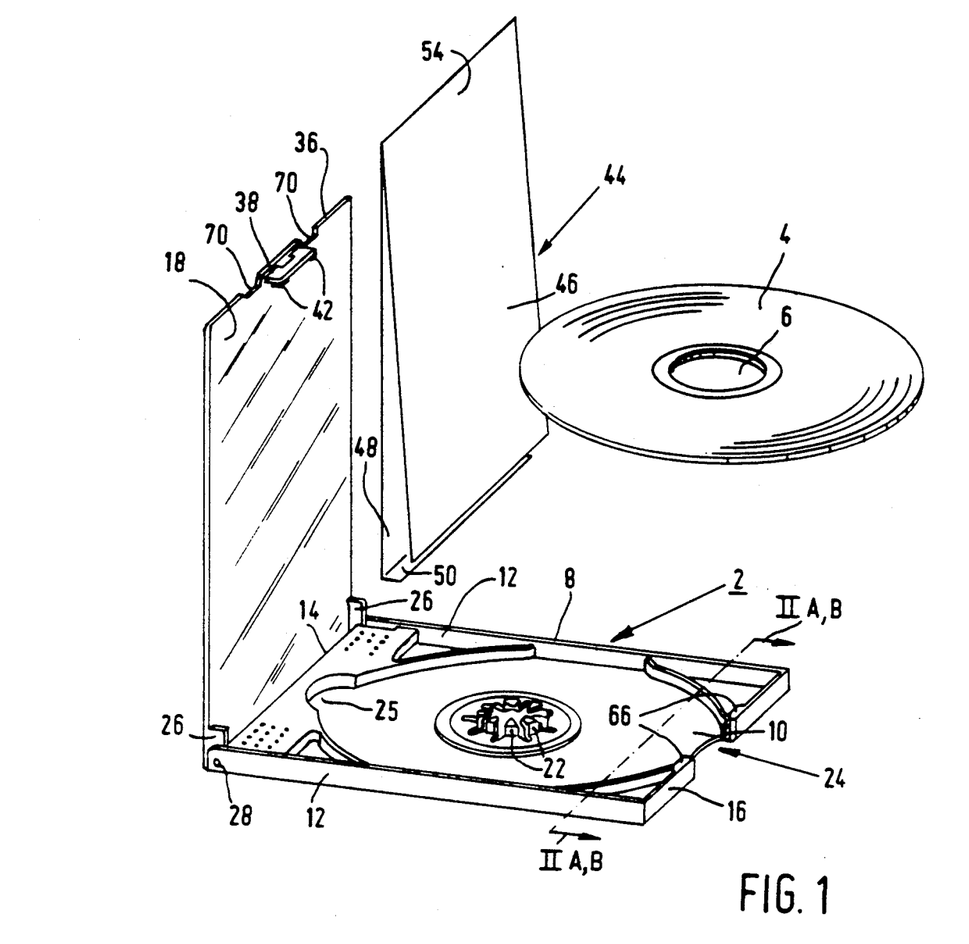
FIG. 1 is a perspective view showing a container having a plastics cover in an open position, and a leaflet which can be inserted in the cover.

FIG. 1 shows a container 2 for a disc 4 having a centre hole 6, for example a 12 cm or 8 cm Compact Disc. The container 2 comprises a bottom section 8, which basically comprises a bottom 10, upright side walls 12, a rear wall 14, and a front wall 16. The upper side of the bottom section 8 is closed by cover 18, which can be held in its closed position by means of a cover lock to be described hereinafter. In order to retain the disc 4 at the periphery of the centre hole 6 the upper side of the bottom section 8 carries an elastic peg arrangement 20 comprising nine pegs 22. This peg arrangement and the area immediately surrounding it corresponds to those of the prior-art CD container described above. The container shown consequently meets the requirements imposed on the prior-art CD container, i.e. the disc is clamped in its centre and is supported by the bottom section exclusively in an area around the centre hole 6.

In accordance with the invention a front wall recess 24 is formed as a gap in the centre of the front wall 16 that is, midway between the side walls 12. As will be described in more detail hereinafter, the cover lock is situated in the proximity of the front wall recess 24 when the cover is closed.

When the cover is closed the space between the front wall recess 24 and the bottom section 8 is large enough for partly inserting a finger. In this embodiment the front wall recess 24 is therefore continued into the bottom 10 of the bottom section.

The side walls 12 as well as the rear wall 14 are imperforate. The front wall recess 24 is the only recess in the walls of the bottom section, which consequently has an optimum stiffness. In the proximity of the rear wall 14 the bottom section is formed with a finger hold recess 25 situated opposite the front wall recess 24. This recess allows finger access to the edge of a disc in order to facilitate removal of the disc from the container.

Figures 8, 9:
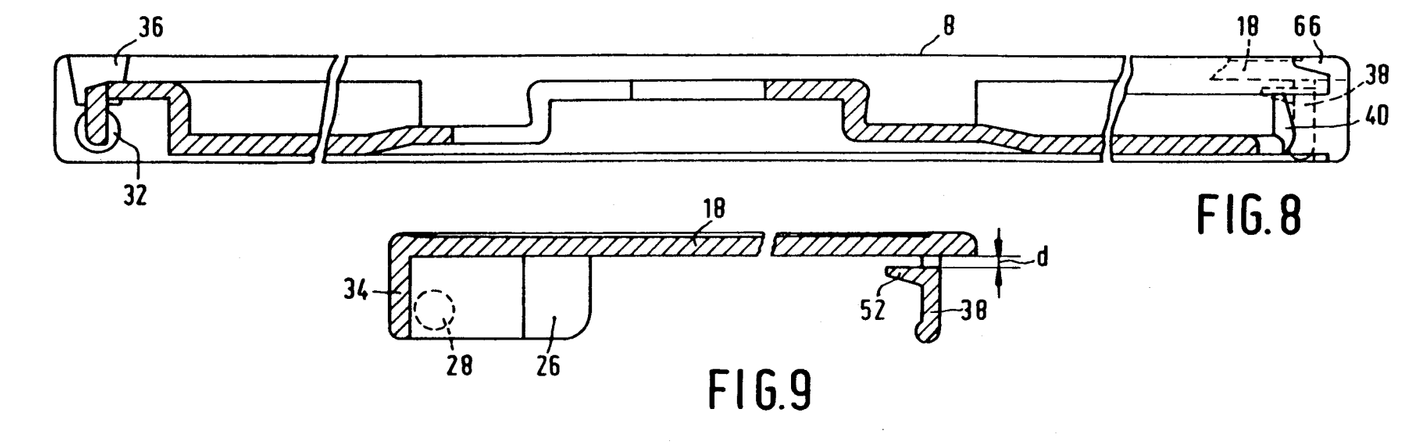
FIG. 8 is a sectional view taken on the lines VII—VII in FIG. 4.
FIG. 9 is a sectional view of the cover, taken on the lines VIII—VIII in FIG. 6.

The plastics cover 18 is connected to the bottom section 8 at the rear. For this purpose the cover comprises upright portions 26 with hinge pins 28 in the proximity of the rear edge. At its rear the upper section is formed with slots 30 for the portions 26. The side walls 12 are formed with recesses 32 corresponding to the hinge pins 28. At the rear the cover has a side 34 which in the closed position covers the rear 14 of the bottom section. FIG. 8 shows that the bottom section is formed with a tapered groove 36 in the proximity of the recesses 32 to guide the hinge pin 28 when the cover is fitted onto the bottom section.

Figure 3A:
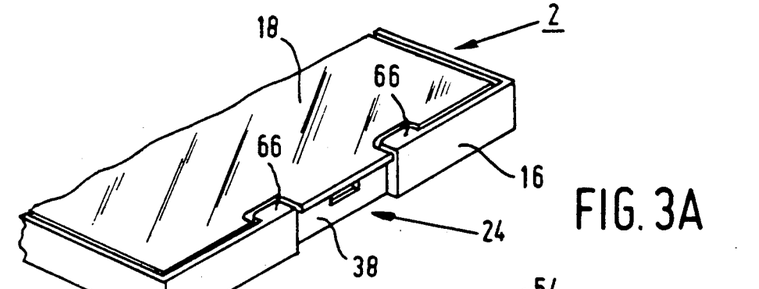
FIG. 3A is a perspective view as indicated by the arrow P in FIG. 2A.

The plastics cover 18 comprises a transverse member 38 at its front 36. In the closed position of the cover the transverse member engages in the front wall recess 24 of the bottom section. For this reference is made to FIG. 3a and also to FIG. 8, the broken lines in the last mentioned Figure representing a part of a sectional view of the cover at the front of the bottom section. The cover is made of a transparent plastics. The bottom section is also made of plastics. The elastic properties of the material of the cover and the bottom section are utilised for mounting the cover onto the bottom section at the rear and for the cover lock. For the cover lock the bottom section is provided with bottom latching portions 40 on its bottom side to cooperate with the transverse member 38 of the cover. The cover is provided with transverse-member latching portions 42 which cooperate with the bottom latching portions 40 to lock the cover.

As already stated, it is possible to insert a leaflet inside the plastics cover 18. FIG. 1 shows a paper leaflet 44 in the form of a double sheet, which consequently has an inner side 46 and an outer side 48. It also comprises a folded over rear portion 50. Since it is folded the leaflets needs to be printed at one side only. The dimensions of the leaflet in principle correspond to the dimensions of the plastics cover 18. At a small distance from the inner side of the cover the transverse member 38 comprises a nose 52 to retain the leaflet. With its folded front edge 54 the leaflet is inserted underneath the nose so that the rear side 50 lies on the inner side of the rear side 34. In this way the leaflet is adequately affixed to the cover. The thickness of the leaflet is not larger than the clearance d between the inner side of the cover and the nose 52.

Figure 1A:
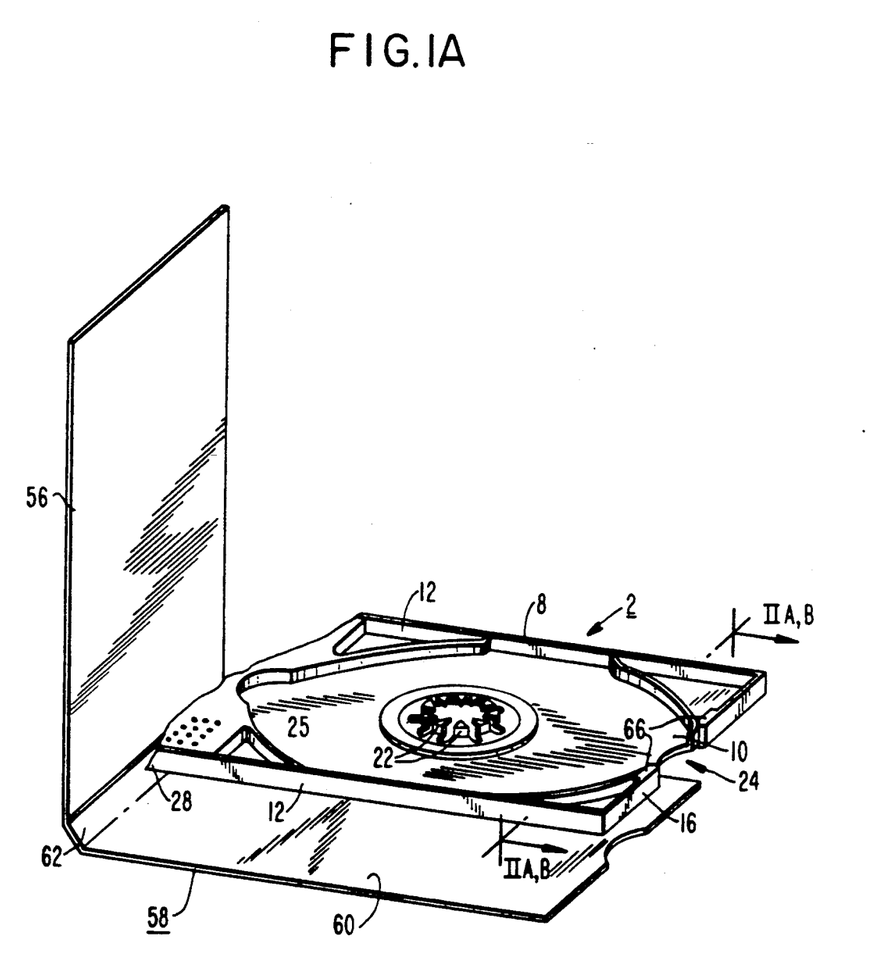
FIG. 1A is a perspective view of a cardboard cover which is an alternative to the plastics cover shown in FIG. 1.
Figures 2A, 2B:
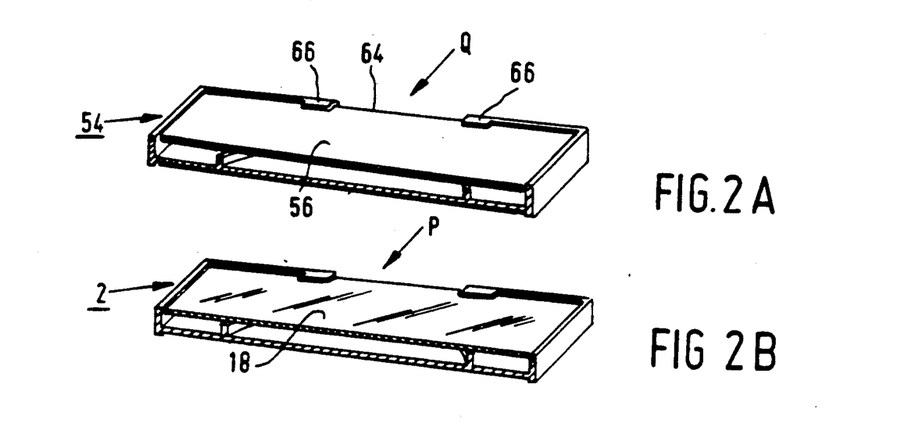
FIG. 2A is a perspective view as indicated by the arrows IIA, B in FIG. 1 in the case that a plastics cover is used.
FIG. 2B is view similar to that in FIG. 2A but now in the case that a cardboard cover is used.
Figure 3B:
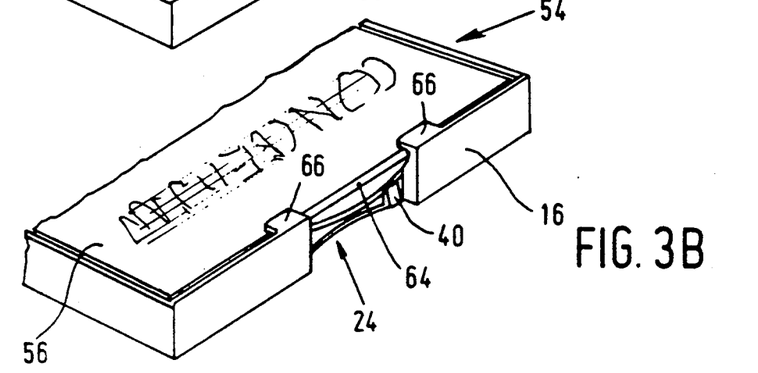
FIG. 3B is a perspective view as indicated by the arrow Q in FIG. 2B.
Figure 4:
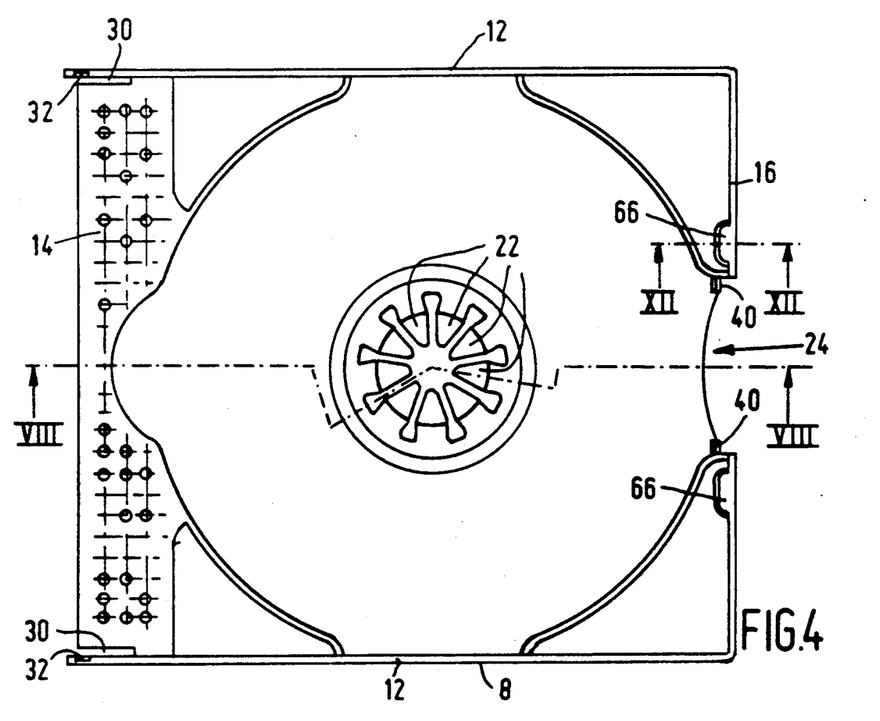
FIG. 4 is a plan view of the bottom section of the container shown in FIG. 1.
Figure 5:
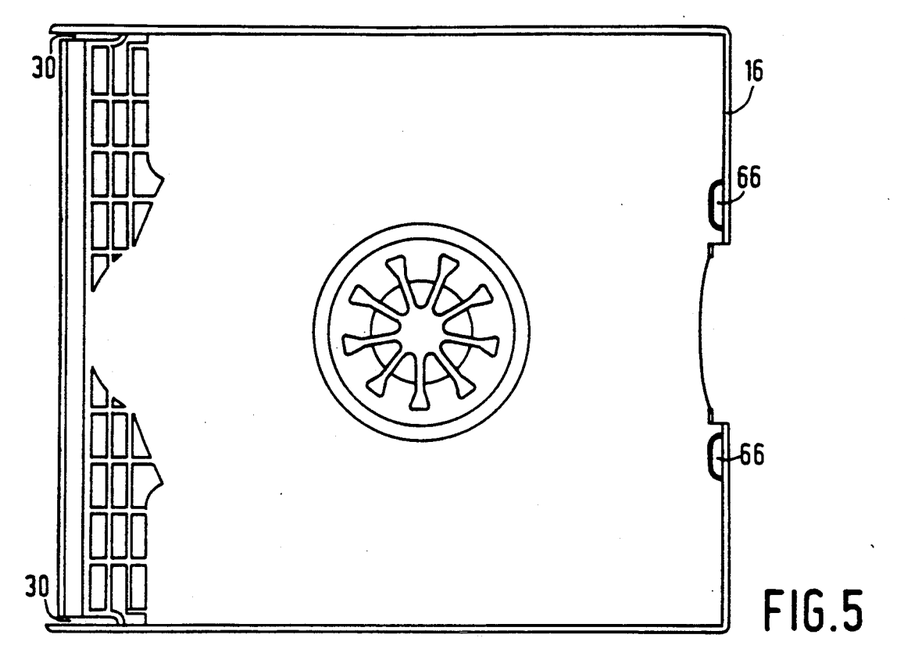
FIG. 5 is an underneath view of the bottom section shown in FIG. 3.
Figure 6:
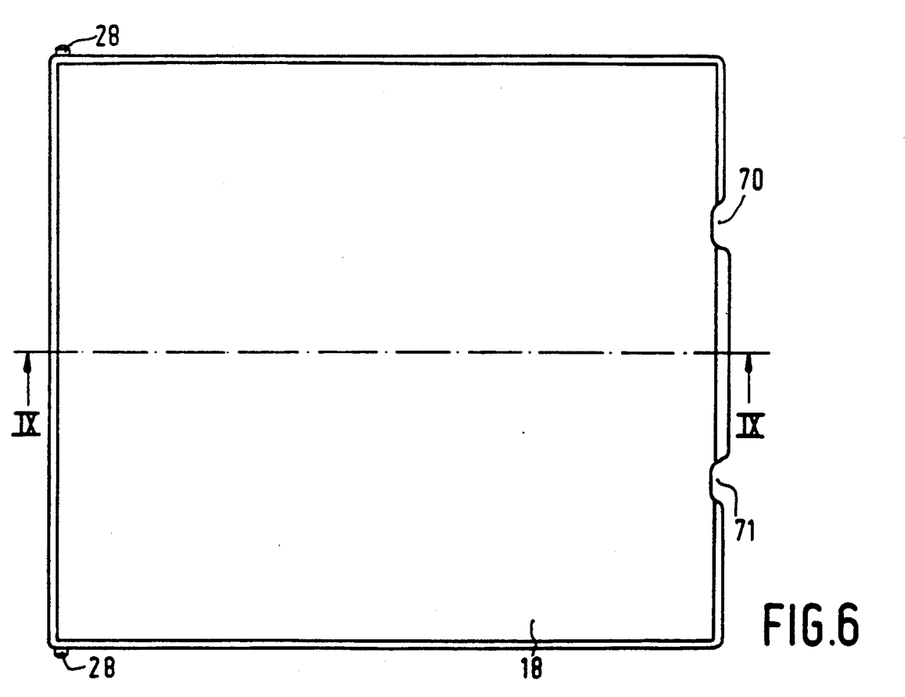
FIG. 6 is a plan view of the plastics cover of the container shown in FIG. 1.
Figure 7:
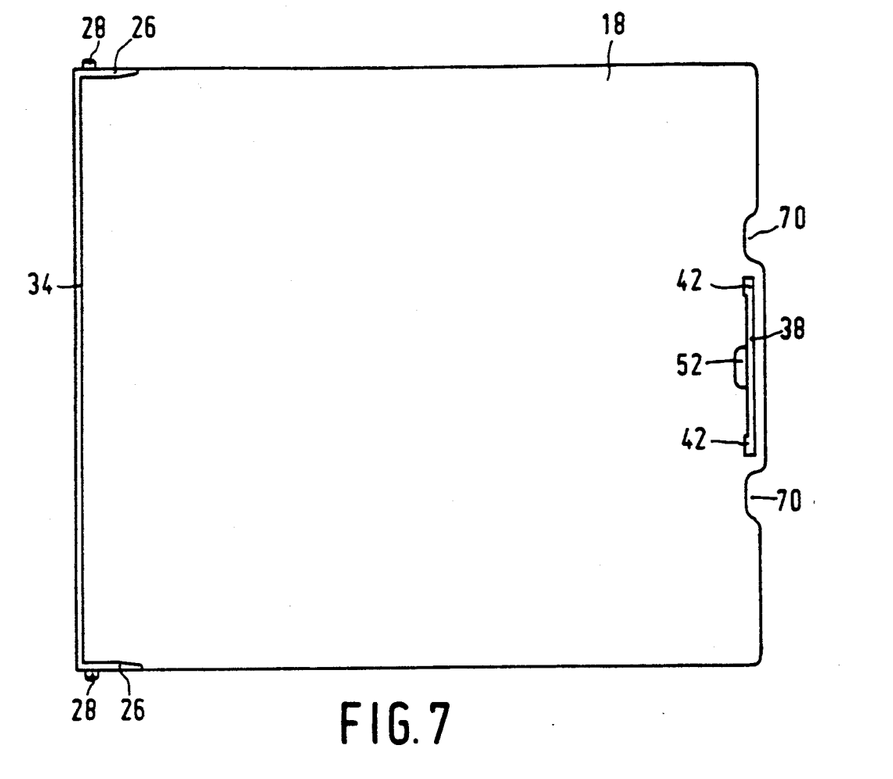
FIG. 7 is an underneath view of the cover shown in FIG. 5.

A special feature of the embodiment shown herein is that the bottom section 8 may be provided with a cardboard cover 56, shown in FIG. 1A, instead of a plastics cover 8. This results in a container 54, see FIG. 2B and FIG. 3B, which forms an interesting alternative to the container 2 for some fields of use. Both containers use the same bottom section 8, which can therefore be used for the two different types of container.

Figures 10, 11, 12:
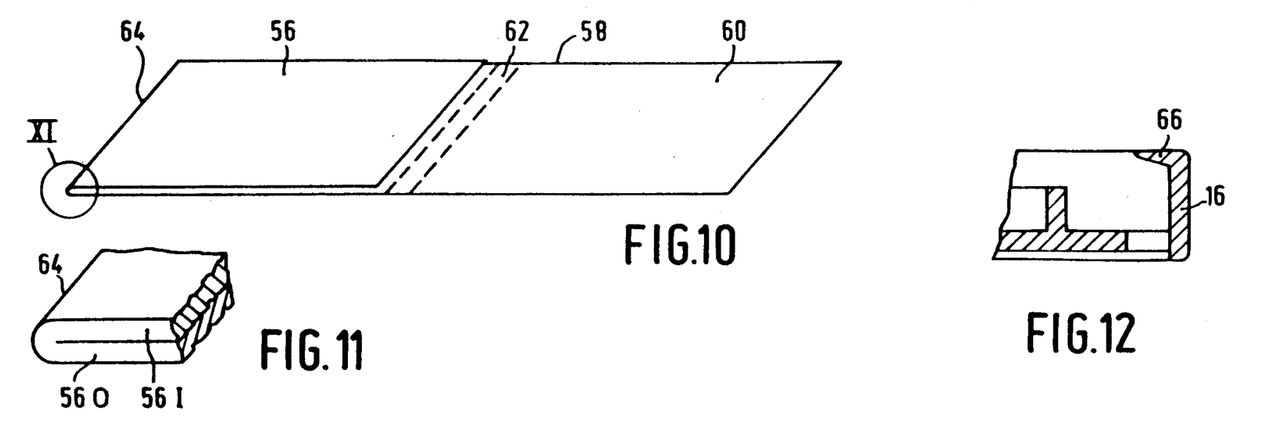
FIG. 10 is a perspective view of a cardboard part.
FIG. 11 shows the part X in FIG. 10 to an enlarged scale.
FIG. 12 is an enlarged-scale sectional view of a part of the bottom section of the container, taken on the lines XII—XII in FIG. 4.
Figure 13:
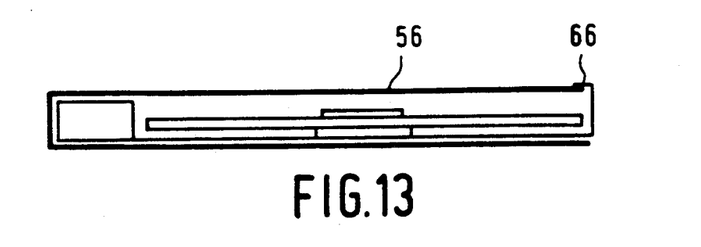
FIG. 13 is a diagrammatic representation, not to scale, of a container comprising a cardboard cover, shown in the closed position.

The cardboard cover 56 constitutes a cover section of a larger cardboard part 58, which in addition to the cover section comprises a lower portion 60 and a rear section 62. The lower section is attached to the underside of the bottom 10 of the bottom section 8, for example by means of an adhesive.

In order to avoid excessive wear when the cardboard cover 56 is used, it is important that the cover consists of two layers and has a crease at the front 64. As is shown in FIG. 11 the cover 56 basically comprises an inner part 56-I and an outer part 56-O.

Figure 14:
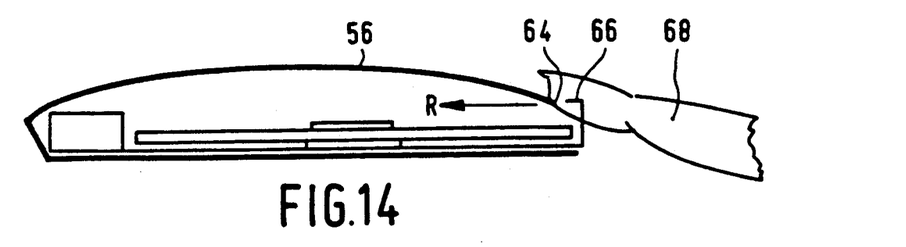
FIG. 14 shows the sectional view of FIG. 13 but now with the cover in a slightly bulged position when the cover is opened with one finger.
Figure 15:
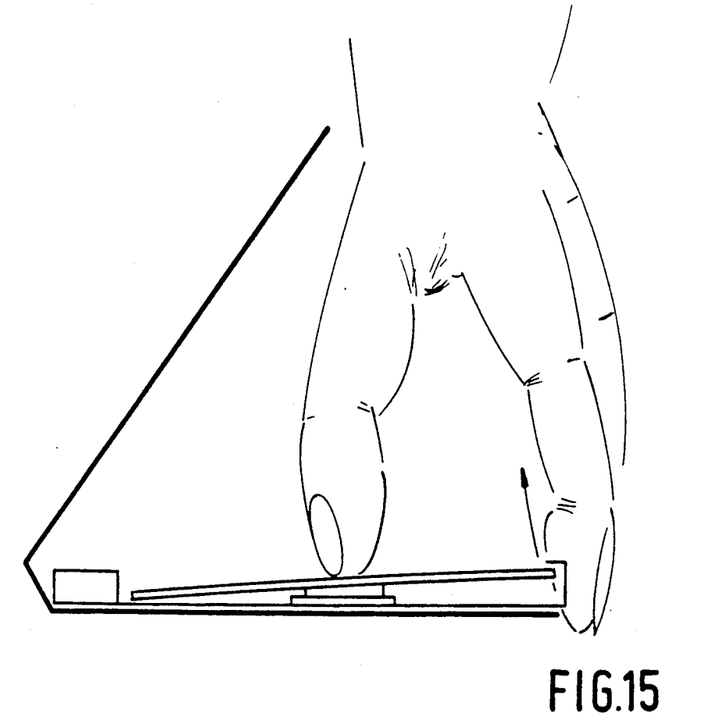
FIG. 15 is a sectional view similar to FIG. 12 but not with opened cover, showing how the disc can be removed with the fingers of one hand.

To lock the cover when it is made of cardboard the bottom section 8 comprises locking noses 66 at opposite sides of the recess 24. In the closed position the front 64 of the cardboard cover 56 is held underneath the locking noses 66. By exerting a small force on the front side 64 of the cover with a finger 68 (see FIG. 14) the cover can be slid towards the rear of the container in the direction "R" to disengage it from underneath the locking noses. The locking noses 66 have such a length that as the cardboard cover 56, see FIG. 14, is slid away in the direction "R" it bulges elastically to some extent. This elastic deformation guarantees that in its closed position the cover remains actually closed.

On account of the use of a universal bottom section 8 comprising locking noses 66 for use in conjunction with a cardboard cover, the front side 36 of the plastics cover 18 is formed with recesses 70 for the noses 66. The locking noses do not have any function in locking a plastics cover but would impair closing of the cover in the absence of the recesses 70.

Figure 16:
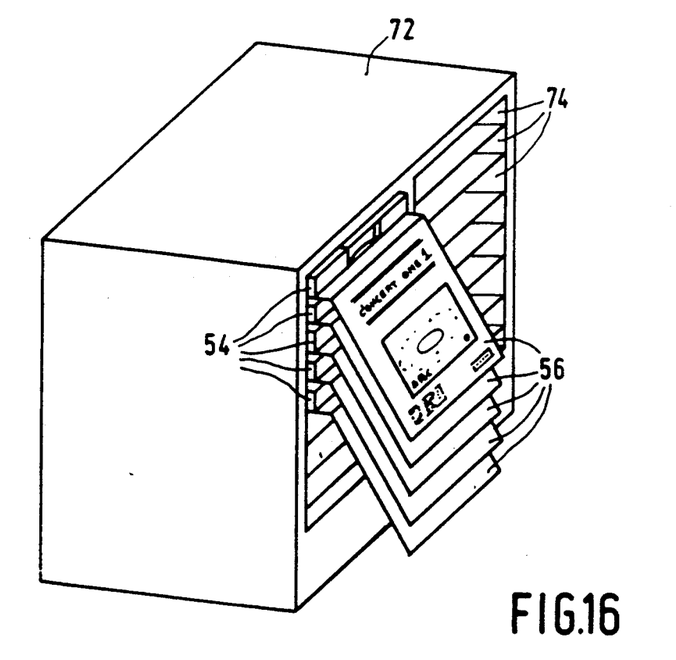
FIG. 16 is a perspective view of a storage system for containers in accordance with an embodiment of the invention.

The leaflet 44 as well as the cardboard cover 56 may be printed in such a way that if the underside of the container faces downward the print on the inner side or on the outer side or on both sides is oriented correctly. This embodiment is of particular importance when a storage system for the container as illustrated in FIG. 16 is used. This Figure diagrammatically shows a storage system 72 comprising a plurality of compartments 64 into which a bottom section of the container can be inserted. The drawing shows that the storage system 72 accommodates five containers 54 having cardboard covers 56. The covers 56 are in their open positions and project downwardly from the system. As a result of this, the print on the inner side of the cover is visible and can be read by the user to select the disc. The hinged cardboard cover 56 can be folded up to search the desired disc. Moreover, the cover which projects from the storage system serves for removing the container of the selected disc from the storage system 72.

Although the invention has been described for two embodiments which both employ a universal bottom section, the invention is not limited to the embodiments shown herein, but covers all the embodiments possible within the scope of the appended Claims. The basic concept of the invention, which can be embodied in an entirely different manner than shown in the drawings, is the use of a front wall recess in the bottom section and a cover lock near the front wall recess. Many further features defined in the subsidiary Claims can similarly be combined advantageously with this basic concept.

I claim:

1. A storage cassette for a disc having a centre hole, said cassette including a bottom section and a flexible cover which is hingedly attached to said bottom section and adapted to close said bottom section; said bottom section including a bottom, upright side walls, a rear wall and a front wall, means for locking said cover closed against said bottom section, comprising a front edge of said cover and rearwardly extending overhanging structure on said front wall, means for unlocking said cover including a gap in said front wall and a recess in said bottom, said recess opening forwardly and being in communication with said gap; and a peg arrangement on said bottom adapted to engage said disc.

2. A storage cassette for storing a disc comprising a base section having a bottom, a rear wall, a front wall and two side walls defining an upward opening; means on said bottom for engaging a centre hole of said disc; and means for closing said opening comprising a cover hinged to said bottom section for articulation therewith, said front wall including a gap, said bottom including a forwardly-open recess in communication with said gap, and said cover including a member extending transversely from said cover and adapted to substantially fill the width of said gap, whereby said gap, said recess and said transverse member provide means to lift said cover and to lift a disc when it is in said cassette, by a finger of a person's hand.

3. A storage cassette for a disc (4) having a centre hole (6), said cassette comprising a bottom section (8) having a bottom (10), upright side walls (12), a rear wall (14) and a front wall (16), a cover (18) pivotable about a location adjacent said rear wall, and a cover lock for holding said cover in a closed position, in the closed position said cover forming a top closure for the bottom section, and said bottom section comprising an elastic peg arrangement engageable in the centre hole of the disc to retain the disc at an upper side central area of said bottom, characterized in that a front wall recess (24) is formed in said front wall midway between said side walls, said recess is continued into the bottom, and in the cover closed position said cover lock is disposed at the location of the front wall recess for engagement by a finger of a person's hand to unlock the cover lock.

4. A storage cassette as claimed in claim 3, characterized in that the cover has an inner side, and comprises a transverse member, said transverse member having a nose disposed at a given distance from said inner side, for retaining a leaflet.

5. A storage cassette for a disc (4) having a centre hole (6), said cassette comprising a bottom section (8) having a bottom (10), upright side walls (12), a rear wall (14) and a front wall (16), a cover (18) pivotable about a location adjacent said rear wall, and a cover lock for holding said cover in a closed position, in the closed position said cover forming a top closure for the bottom section, and said bottom section comprising an elastic peg arrangement engageable in the centre hole of the disc to retain the disc at an upper side central area of said bottom, characterized in that a front wall recess (24) is formed in said front wall midway between said side walls, the cover is a cardboard cover (56) and forms a cover section of a cardboard part (58) which, in addition to the cover section, comprises a lower section (62) and a rear section (62), the lower section being arranged at the underside of the bottom (10) of the storage cassette, and in the cover closed position said cover lock is disposed at the location of the front wall recess for engagement by a finger of a person's hand to unlock the cover lock.

6. A storage cassette as claimed in claim 5, characterized in that in the closed position the front wall recess (24) defines a space between the cover and the bottom section (8) large enough for partly inserting a finger.

7. A storage cassette as claimed in claim 5, characterized in that the cardboard cover (56) consists of two layers and is folded at the front (64).

8. A storage cassette as claimed in claim 5, characterized in that to form the cover lock, the bottom section (8) is provided with locking noses (66) at opposite sides of the front recess (24), and in that at the location of the front wall said cardboard cover (56) can be held in its closed position underneath the locking noses (66) and is disengageable from underneath the locking noses (66) by a gentle pressure acting in the direction (R) of the rear section.

9. A storage cassette as claimed in claim 8, characterized in that the locking noses are so long that said cardboard cover bulges elastically to some extent as it is slid away.

10. A storage cassette as claimed in claim 5, characterized in that the cover has inner and outer sides, at least one of said two sides of the cover being provided with printing which is oriented correctly when the underside of the bottom faces down, and the cover is opened and is hanging down.

11. A storage cassette for a disc (4) having a centre hole (6), said cassette comprising a bottom section (8) having a bottom (10), upright side walls (12), a rear wall (14) and a front wall (16), a cover (18) pivotable about a location adjacent said rear wall, and a cover lock for holding said cover in a closed position, in the closed position said cover forming a top closure for the bottom section, and said bottom section comprising an elastic peg arrangement engageable in the centre hole of the disc to retain the disc at an upper side central area of said bottom, characterized in that said bottom section is a universal bottom section comprising locking noses forming part of the cover lock for use with cardboard covers, a front wall recess (24) is formed in said front wall midway between said side walls, said cover is a plastic cover pivotally connected to the bottom section at the location of the rear wall, comprising a front side having a transverse member which, in the closed position, projects into the front wall recess; and said cover further has front recesses within which, in a closed position, said locking noses are disposed, and in the cover closed position said cover lock is disposed at the location of the front wall recess for engagement by a finger of a person's hand to unlock the cover lock.

12. A storage cassette as claimed in claim 11, characterized in that the cover has an inner side, to said transverse member, said transverse member having a nose disposed at a given distance from said inner side, for retaining a leaflet.

13. A storage cassette for a disc (4) having a centre hole (6), said cassette comprising a bottom section (8) having a bottom (10), upright side walls (12), a rear wall (14) and a front wall (16), a cover (18) pivotable about a location adjacent said rear wall, and a cover lock for holding said cover in a closed position, in the closed position said cover forming a top closure for the bottom section, and said bottom section comprising an elastic peg arrangement engageable in the centre hole of the disc to retain the disc at an upper side central area of said bottom, characterized in that a front wall recess (24) is formed in said front wall midway between said side walls, the cover is a plastics cover (18) which is pivotally connected to the bottom section (8) at the location of the rear wall (14) and which comprises a front side having a transverse member (38) which projects into the front wall recess in the closed position, in order to form the cover lock the bottom of the bottom section is provided with bottom latching portions (40) for the transverse member (38), and in the cover closed position said cover lock is disposed at the location of the front wall recess for engagement by a finger of a person's hand to unlock the cover lock.

14. A storage cassette as claimed in claim 13, characterized in that, the side walls (12) and the rear wall (14) are imperforate.

15. A storage cassette as claimed in claim 13, characterized in that in the proximity of the rear wall (14) the bottom section is formed with a finger hold recess (26) opposite the front wall recess, to allow finger access between an edge of the disc and the bottom section.

16. A storage cassette as claimed in claim 13, characterized in that the cover (18) comprises transverse-member latching portions (42) which are interengageable with the bottom latching portions (40).

17. A storage cassette as claimed in claim 13, characterized in that the front wall recess (24) defines a space between the cover and the bottom section (8) large enough for partly inserting a finger.

* * * * *